United States Patent [19]

Rhodes et al.

[11] 4,295,259
[45] Oct. 20, 1981

[54] METHOD OF FILLING SPIKE HOLES IN RAILWAY TIES

[75] Inventors: Curtis A. Rhodes; Tim A. Jur; Donald A. Keating, all of Columbia, S.C.

[73] Assignee: Canron Corp., Columbia, S.C.

[21] Appl. No.: 951,132

[22] Filed: Oct. 13, 1978

[51] Int. Cl.³ .............................................. B23P 7/00
[52] U.S. Cl. .................................. 29/402.18; 29/432; 29/458; 29/526 R; 156/92; 238/370; 264/36
[58] Field of Search ................. 29/401 A, 458, 526 R, 29/432, 402.18; 156/94, 92; 264/36, 46.4, 46.6; 238/370, 29, 83

[56] References Cited

U.S. PATENT DOCUMENTS

| | | | |
|---|---|---|---|
| 3,082,578 | 3/1963 | Lindstaedt | 156/92 UX |
| 3,380,213 | 4/1968 | Hartman et al. | 264/36 X |
| 3,492,381 | 1/1970 | Rhyne | 264/36 X |
| 3,558,049 | 1/1971 | Pennino | 238/29 |
| 3,716,608 | 2/1973 | Neumann | 264/36 |
| 4,070,201 | 1/1978 | Tessenske | 238/371 X |
| 4,134,546 | 1/1979 | Dankert | 238/370 |

FOREIGN PATENT DOCUMENTS 500109 1/1939 United Kingdom ................ 238/371

Primary Examiner—Charlie T. Moon
Attorney, Agent, or Firm—Wenderoth, Lind & Ponack

[57] ABSTRACT

A method of re-using wooden railroad ties in which the old spike holes are filled with a high density rigid polyurethane foam injected into the holes. The foam serves as a plug which prevents or retards deterioration of the tie at the hole site primarily by preventing or mitigating ingress of moisture. Additionally, the foam serves to anchor a new spike if by chance the same hole location is used when re-spiking the tie. The foam has good retention properties even if the spike is driven in before the foam has fully set.

8 Claims, 1 Drawing Figure

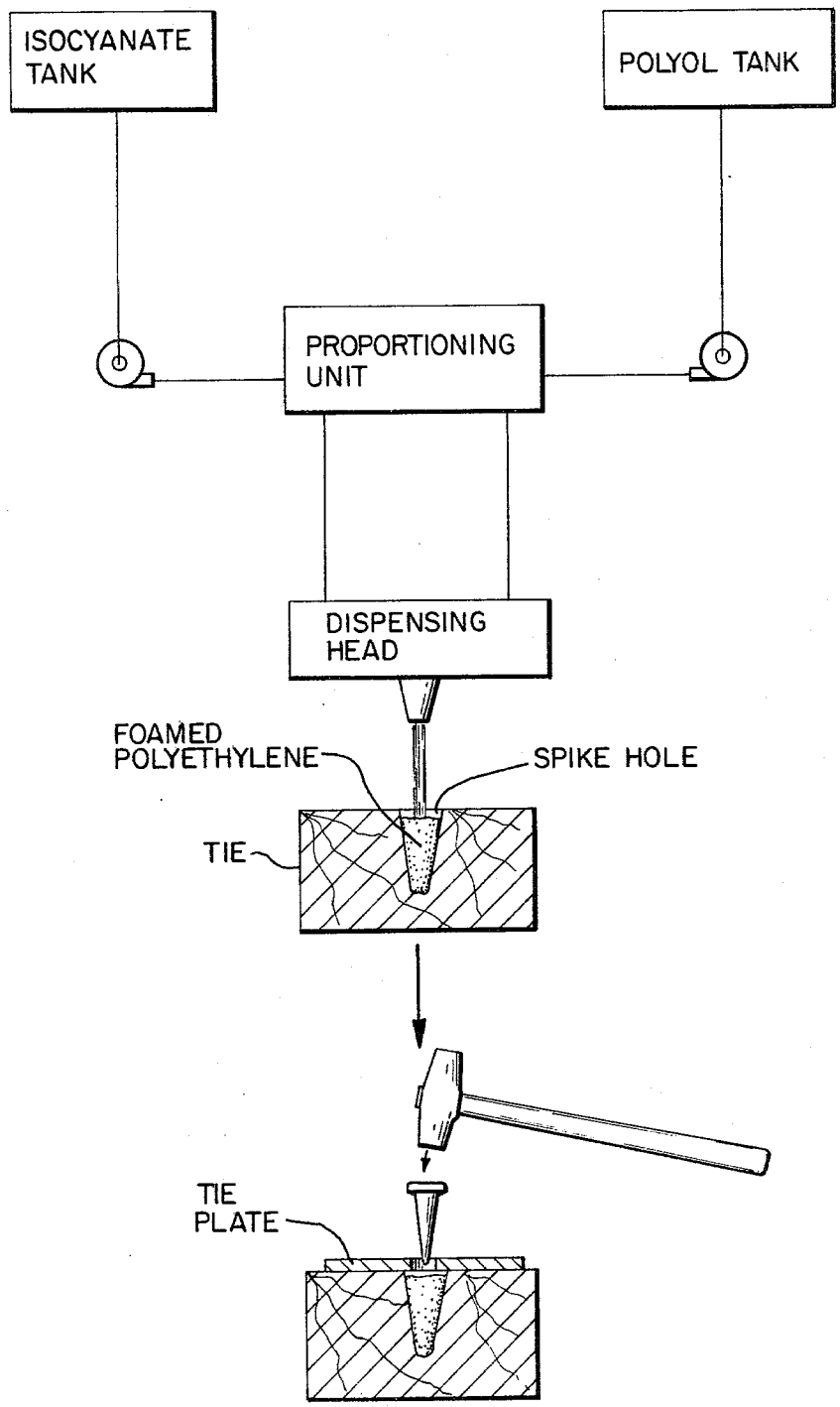

METHOD OF FILLING SPIKE HOLES IN RAILWAY TIES

BACKGROUND OF THE INVENTION

This invention relates to a technique for re-using wooden railroad ties and, in particular, for plugging the old spike holes after the old spikes have been removed.

To replace existing rails the spikes securing the rails through a tie plate to the ties have to be removed before the existing rails can be removed. The existing wooden ties are then usually inspected to determine which are still in a fit condition for re-use. Those which have deteriorated badly are replaced either with new ties or possibly with other old ties from a different site. Before the old ties can be re-used, it is necessary to plug the holes left by the old spikes so that, firstly, deterioration of the ties at the hole sites will be retarded, primarily by sealing against ingress of moisture, and so that new spikes can be driven into the ties to secure the new rails without the necessity for insuring that the spikes miss the old hole location; in other words, the plugged hole should be able to retain securely a new spike.

The conventional method of plugging spike holes in old wooden ties is by manually inserting wooden pegs which are then hammered into place. The process involves four men, two on each side of the track. On each side of the track one man inserts the pegs into the spike holes and the second drives the pegs into the holes with a ramrod.

Obviously, this technique is very labor intensive and is not compatible with automated or semi-automated track renewal systems which are being developed to replace and repair railroad track.

Other methods of plugging old spike holes have been proposed. For example, a sand mixture may be poured into the spike holes but this has several disadvantages. Firstly, the mixture is difficult to get into the hole, secondly it does not offer an effective seal against moisture and, thirdly it may not stay in the hole during service.

Another technique which has been proposed is the use of a plugging material which comprises a mixture of a granular abrasive material and a granular plastic material, these two components being thoroughly mixed to form a substantially homogeneous mixture which is poured into the holes. When a spike is driven into the hole containing the material, the friction between the spike and the abrasive material generates enough heat to plasticize the plastic material and, as a consequence, the plastic material flows and then cools to provide a bond between the spike and tie. Such a technique is disclosed in U.S. Pat. No. 4,070,201 which issued in Jan. 24, 1978 to Racine Railroad Products, Inc. as assignee.

A disadvantage of this last technique is that, unless the spike enters the filled hole, there will be no heat generated to cause flowing of the plastic material. Thus, in the case where a spike misses the hole, the material in the hole will remain in powder form and will not, therefore, serve to plug the hole effectively against the ingress of moisture.

A further disadvantage is that the plastic temperature of the material has to be controlled very carefully to ensure, on the one hand, that the material will not plasticize during storage in hot climates and that it will, on the other hand, plasticize in cold climates during the spike driving operation. In view of the fact that the heat generated during the spike driving operation is probably also a function of the type of spike driving equipment in use and the amount and type of abrasive in the mixture, it can be seen that it would be difficult to obtain a plugging mixture which is universal in the sense that it can operate under a full range of ambient temperatures.

Another disadvantage of the above technique is that it is probable that the spike holes have to be dry before the mixture can be applied or, at any rate, the technique may not be satisfactory during wet weather.

Finally, the cost of obtaining or preparing the mixture suitable for use in this technique is rather high.

SUMMARY OF THE PRESENT INVENTION

It is, therefore, and object of the present invention to provide a new method for plugging holes, particularly spike holes, in wooden railway ties.

It is also an object of the invention to reuse the plugged ties, so obtained, by applying spikes through tie-plates and into the tie without differentiating between the plugged hole or the unused wood of the tie.

It is an object of the present invention to provide a tie hole plugging method which obviates or mitigates all or some of the disadvantages referred to above in connection with known techniques.

To this end, the present invention involves injecting a polyurethane foam into the holes in wooden ties, foaming taking place in the holes.

It should be appreciated that, where the holes are old spike holes which have to be plugged so as to be capable of retaining securely a new spike, not all polyurethane foams could be employed satisfactorily. Polyurethane foams are all the complex reaction products of various isocyanates and polyhydroxy compounds (polyols). When polyols of higher functionality, i.e. more hydroxyls per molecule, are used the result is a so-called "rigid" foam and when polyols of lower functionality are used the result is a "flexible" foam. For reasons which should become apparent from the following disclosure, the use of flexible polyurethane foams is not recommended in carrying out the method of the invention.

A third class of polyurethane foams is recognized in the art and that is "semi-rigid" foams, this type falling somewhere between the "rigid" and "flexible" types and it is believed that at least those at the rigid end of the "semi-rigid" range would be acceptable for spike holes. Thus, an aspect of the method of the present invention is the recognition that a comparatively rigid polyurethane foam is required.

Another aspect of the present invention is the recognition that the density of the polyurethane foam plays a role in determining the usefulness of a particular foam for filling spike holes. It is believed that polyurethane foams are available in densities which range from 1 lb/ft$^3$ up to 50 or 60 lb/ft$^3$. Five different densities, namely 2 lb/ft$^3$, 6 lb/ft$^3$, 8 lb/ft$^3$, 10 lb/ft$^3$ and 15 lb/ft$^3$ were all tested and found suitable and it is believed that foams having densities above and below the 2-15 lb/ft$^3$ range tested would be acceptable. It is recognized, however, that as the density is decreased a corresponding decrease in strength or holding power is obtained and a low point will be reached where foam will be unacceptable. On the other hand, as the density is increased the decrease in cell space renders the plug as a whole harder and less yielding until a point is reached where the plug is too massive to receive and retain well a spike. From the experimental data obtained and observations made, it seems reasonable to suppose that densities much lower than the two pounds per cubic foot tested would provide adequate results, perhaps even down to 1 lb/ft$^3$, whereas the upper end of the range may well be more likely to be limited by the commercial cost of the more dense materials employed before a technically unacceptable density would be reached. From the tests and data obtained, a reasonable upper limit would seem to be in the nature of 30 lb/ft$^3$. Thus as a practical matter, a range of about 1 lb/ft$^3$ to 30 lb/ft$^3$ is to be preferred.

There is also a possibility that the optimum density or density range is related to the density of the particular wood of which the tie is made but this has not, as yet, been verified experimentally.

The foam may be allowed to set before subsequently driving the spikes or a spike may be driven into the plugged hole before the polyurethane foam has set. In either case, adequate spike retention is obtained.

It should be noted that, even if the new spike does not enter the plugged hole, the plug is operative to prevent or retard deterioration of the wood in the vicinity of the hole and so, in that case, the plug acts as a repairing medium rather than a spike anchoring medium.

Commercially available polyurethane foams may be used within an extremely broad temperature range without detriment to the ability of the foam to plug the hole and retain the spike effectively. Thus, a universal material can be used without regard to the normal ambient temperatures to be expected.

Furthermore, apparatus for preparing and applying such foam is already commercially available.

The present technique can be used satisfactorily even if the old holes contain some water as the generation of the foam in the hole tends simply to displace any water therein.

The cost of the polyurethane foam is lower than that of wooden pegs or the plastic material/abrasive material mixture.

Finally, the ease with which the present invention may be carried out makes it eminently suitable for incorporation in an automatic railroad track replacing and repairing machine.

Other objects and advantages of the invention will become apparent from the following description taken with the accompanying drawing which illustrates schematically the method of the invention.

DESCRIPTION OF THE PREFERRED EMBODIMENTS

One rigid polyurethane foam which has been found to be suitable in the method of the present invention is a foam which was available from Witco Company under the trade name Witco Isofoam. This was formerly available under number DRC-15-79-A/B. This foam has a density of 10 lb/ft$^3$. Two other suitable rigid polyurethane foams are available from General Latex and Chemical Corporation (of Ohio) under the trade name Vultafoam. These two foams in the 16-L-600 molding series are specifically 16-L-608 and 16-L-615, the 08 referring to 8 lb/ft$^3$ and the 15 indicating a density of 15 lb/ft$^3$.

Dispensing equipment for these foams is commercially available in different forms. Essentially however, two storage tanks contain, respectively, an isocyanate and a polyhydroxy compound (polyol). Two pumps operate to pump the two components from the storage tank to a proportioning unit where the components are measured out according to a specified ratio and then pumped separately to a dispensing head, gun or wand. At the dispensing head, the components are mixed and ejected. Depending upon the system a solvent flush may be required to prevent as-mixed materials from forming in various cavities and channels within the dispensing head. This was the type of system required for the two General Laxtex foams tested.

The entire system is temperature controlled using a combination of heaters on the storage tanks and heaters attached to the hoses leading from the proportioning unit to the dispensing head. Manufacturers of polyurethane chemicals caution that both components not be allowed to drop below 55° F. at any time, including shipping and storage. Temperatures below 55° F. apparently have a deleterious effect on the properties of the final product. Temperature control during operation is used to regulate viscosity. Viscosity control is important for proper proportioning and for proper mixing at the dispensing head.

One preferred dispensing system, supplied by the Gusmer Corporation, uses a mixing arrangement which avoids the use of a solvent flush. In this system, the dispensing head is formed with an outlet nozzle which is kept normally closed by a valve rod which is withdrawn by actuation of a trigger to permit the two component parts of the mixture to be mixed and ejected in one operation. As the valve rod returns to its closed position it mechanically cleans the nozzle. The equipment effectively dispenses the polyurethane foam is controlled shot size and a dispensing head is available which can be easily adapted to plugging holes in ties. Because of the higher viscosity of the General Latex foam tested and referred to above this system was not suitable with these two foams.

The method of the present invention was tested together with conventional plugging methods such as those referred to above. In a first test, spikes were driven into oak ties in a laboratory using a universal testing machine, the spikes then being withdrawn by the machine and the withdraw force required being measured automatically on the machine's load indicator.

The prepared holes were then filled, respectively, with different materials under test. The main material under consideration was, of course, a high density rigid polyurethane foam but also being tested for comparison were wooden pegs, a plastic material/abrasive material mixture such as that described in U.S. Pat. No. 4,070,204 and known as Racine Tie-Savr, a filled epoxy known as JS Chemical ET1332, a filled epoxy known as 3M Patchwood, a thermoplastic known as Union Oil AMSCO and an unfilled epoxy available from Chemical Components.

Spikes were then driven into the now-filled holes and extracted as before. Once again, the load required to pull the spike was recorded. The ratio of the as-filled pulling force to the original pulling force was also recorded.

The ties used in the testing program were, for the most part, ties that had seen previous service. Many arrived with spikes, and as a result, holes already in place. These holes were used in the test program but were identified as "old holes". The data from "old holes" provided a useful comparison with holes that had been "formed" in the laboratory.

A summary of the experimental holding force data obtained are contained in Table 1. The forces shown in Table 1 are averages of the total data obtained.

TABLE 1

Summary of Initial Test Data

| Plugging Material | Average Initial Pull Force, lb × 10³ | Average, Pull Force with Plugging Mtl., lb × 10³ | Ratio |
|---|---|---|---|
| Racine Tie-Savr | 8.1 | 6.2 | 0.77 |
| High Density Rigid Polyurethane Foam* | 8.5 | 6.1 | 0.72 |
| Wood Pegs | 7.8 | 5.2 | 0.67 |
| J. S. Chemical ET1332 (filled epoxy) | 6.9 | 4.6 | 0.67 |
| 3M Patchwood (filled epoxy) | 7.8 | 3.8 | 0.49 |
| Union Oil AMSCO (thermoplastic) | 9.7 | 2.9 | 0.30 |
| Chemical Components Unfilled Epoxy | 10.7 | 2.9 | 0.27 |

*General Latex Vultafoam and Witco Isofoam

In the table, the materials are ranked in decreasing order of their holding ability. The first column is the average of the pull force required to remove the spike after initially being driven into the tie. The next column is the average pull force with the plugging material, which as can be seen ranges from 6200 to 2900 pounds. The ratio of pulling force with plugging material to the initial pulling force is listed in the third column. This ratio is a somewhat more accurate evaluation of material performance because of data scatter due to variations in the quality of the cross ties used in the test program. By comparing values in the second and third columns, it is seen that the ranking of materials is identical if either the average pull force or ratio is used.

Results indicate that the holding force of wood pegs, Racine Tie-Savr, high density rigid polyurethane foam, and J.S. Chemical ET1322 filled epoxy all have similar holding ability. Because the results obtained using the three different polyurethane foams described above appeared to be similar, all the data were combined.

The data averages in Table 1 for chemical materials are for spikes driven into fully hardened material. During actual in-service application a few spikes are inserted approximately one minute after the holes are plugged. The remaining spikes are then inserted approximately five minutes after the holes are plugged. Both 3M Patchwood and the Chemical Components epoxy have hardening times in excess of five minutes. The data in Table 1, therefore, do not provide a totally accurate evaluation of these materials. A few tests were run in which spikes were driven into holes plugged with these materials before they had reached a fully-hardened condition. Although some improvement was observed, the increase in holding strength was not sufficient to offset the high cost of these materials.

From Table 1, therefore, it can be seen that the plugging method involving the use of the high density rigid polyurethane foam achieves spike retention properties similar to that provided using the Racine Tie-Savr and considerably greater than the spike retention achieved using most of the other materials. It was found, in fact, that certain of the materials gave evidence of promoting detrimental spike-tie interraction. For example, in the case of the hole filled with the unfilled epoxy of Chemical Components, it was seen (after withdrawing of the spike on section) that the spike when inserted was deflected by the hard epoxy and did not follow the path of the old spike hole.

With regard to the holes filled with the 3M Patchwood filled epoxy and the Union Oil AMSCO thermoplastic, it appeared that because these materials are much more flexible than the rigid polyurethane, for example, they are not as prone to "collapse" and, consequently, these materials were forced into existing cracks in the tie when a spike was inserted resulting in splitting of the tie and reduction of the retention force.

A number of experiments were performed to further test the performance of rigid polyurethane foam under conditions encountered in the field. The following factors were tested:

(a) Insertion of the spike before the foam was fully hardened.
(b) Holding capability of the plugging material in spike holes where the spike has been previously in service.
(c) Low temperature plugging of spike holes (20° F.).
(d) Injection of polyurethane foam into holes saturated with water.

TABLE 2

Spike Pull Force for Spikes Driven Prior to Foam Hardening (Witco Isofoam DRC-15-79-A/B)

| Initial Pull Force, lb × 10³ | Pulling Force with Plugging Mt., lb × 10³ |
|---|---|
| 7.6 | 15.5 |
| 10.7 | 9.8 |
| 9.9 | 9.0 |
| 9.1 | 12.1 |
| 9.4 | 7.1 |
| 7.9 | 6.1 |
| 9.9[a] | 9.0 |
| 9.1[a] | 12.1 |
| 9.4[a] | 7.1 |
| 7.9[a] | 6.1 |
| 4.7[b] | 7.0 |
| 3.1[b] | 10.6 |

[a] Spike hole wet with water
[b] Old spike hole

TABLE 3

Low Temperature (20° F.) Foam Injection Experiments (Witco Isofoam DRC-15-79-A/B)

| Initial Pull Force, lb × 10³ | Pull Force with Plugging Mtl., lb × 10³ | Comments |
|---|---|---|
| 3.4[a] | 10.3 | Hardened |
| 7.8 | 7.2 | Hardened |
| 7.8 | 9.1 | Hardened |
| 4.2[a] | 9.4 | Before Hardening |
| 7.0 | 11.2 | Before Hardening |
| 7.9 | 9.9 | Before Hardening |
| 8.5 | 10.2 | Before Hardening |

[a] old spike hole

Tables 2 and 3 contain experimental data which were obtained to show the effect of each of the factors listed above. Table 2 contains data for twelve experiments using the Witco Isofoam DRC-15-79-A/B in which the spike was inserted while foaming was taking place. In two cases the spikes already in place in as-received ties were removed and filled with material. Notice that the force required to remove these spikes is approximately one-half that required to remove a spike that is pulled out immediately after driving. In four of the experiments, the spike hole was maintained filled with water for approximately five minutes. Excess water was then drained from the spike hole and the polyurethane was injected. The spike remained in the tie for several hours before determining its pull force.

These data indicate that the holding capability of the material is at least as high when the spike is inserted before hardening as it is after hardening. It is also seen that the pull force of a spike in an old plugged hole is comparable to that of formed spike holes. In addition, the experimental data indicates that water does not appear to adversely effect the pull force.

The experimental data shown in Table 3 were obtained at a tie temperature of 20° F. The Witco Isofoam DRC-15-79-A/B polyurethane was mixed and injected into the spike hole at room temperature. In the first three experiments, the polyurethane had hardened before inserting the spike while in the remaining experiments the spike was inserted during foaming. Two experiments were performed using old spike holes as indicated earlier. Experimental data are comparable to earlier results. Thus, plugging the spikes with atmospheric temperatures as low as 20° F. does not have any noticeable effect on the pull force of the spikes.

Polyurethane foam is capable of withstanding temperatures up to 200° F. which exceeds the maximum that would be expected on the railroad. The low-temperature properties of rigid polyurethane foam is reported to be good. Stiffness decreases with temperature such that at −328° F. the stiffness is approximately double that at room temperature. High density polyurethane foam has low permeability to water and other fluids. It is inert to other chemical additives, such as creosote, which might be present in the tie.

The mechanism of spike retention is believed to be of interest. Originally, with the use of epoxies, polyurethanes and various other chemical based filling materials, it was expected that spikes would actually be "glued" in place. Continuous observation of extracted spikes under a variety of conditions showed, however, that gluing is not the primary mechanism. Instead, the best conclusion that can be drawn from many observations is that the spikes in holes filled with polyurethane foam are held in place by a mechanism of compression of fibers and filler material in the immediate vicinity of the hole. It is expected that this mechanism differs very little from that which holds a spike originally driven into the tie. If the polyurethane foam used is too flexible it will be pushed in front of the spike rather than accept the spike and that is why so-called "flexible" foam is not recommended. However, tests have shown that some degree of flexibility is acceptable.

What I claim as my invention is:

1. An in situ method of plugging spike holes in a succession of wooden railroad ties and then securing a rail to the ties, comprising: mixing components of a polyurethane foam which is foamable and curable at an outdoor ambient temperature and ambient pressure and which when foamed and cured has a sufficiently high rigidity and density to retain a spike when subsequently driven into foamed polyurethane and the polyurethane is cured, and then immediately injecting the mixed components into the spike holes to a depth sufficient for causing the polyurethane when it is foamed to at least partially fill the holes; causing the holes and the ties to remain at ambient conditions of outdoor temperature and pressure while the foaming and curing of the polyurethane is completed; and before the polyurethane has cured, placing rail-holding tie plates on the ties over the thus filled spike holes and driving spikes through the tie plates and into thus plugged holes aligned therewith before the polyurethane has cured, for securing a rail to the ties.

2. A method as claimed in claim 1 in which the step of driving the spikes comprises driving the spikes into the thus plugged holes while the polyurethane is foaming.

3. A method as claimed in claim 1 in which the components are components which when the polyurethane is foamed and cured form a comparatively rigid and comparatively dense polyurethane foam.

4. A method as claimed in claim 3 in which the foamed polyurethane is rigid foamed polyurethane.

5. A method as claimed in claim 3 in which the foamed polyurethane is a semi-rigid foamed polyurethane.

6. A method according to claim 3 in which the density of the polyurethane foam is in the range of approximately 2 lb/ft$^3$ to approximately 15 lb/ft$^3$.

7. A method according to claim 6 in which the polyurethane foam has a density of approximately 10 lb/ft$^3$.

8. A method according to claim 7 in which the components of the polyurethane have low viscosity.

* * * * *